(12) United States Patent
Filipenko et al.

(10) Patent No.: US 12,275,393 B2
(45) Date of Patent: Apr. 15, 2025

(54) SYSTEM AND METHOD FOR OPTIMISING PERFORMANCE OF AN AUTONOMOUS RACE CAR

(71) Applicants: Constructor Technology AG, Schaffhausen (CH); Constructor Education and Research Genossenschaft, Schaffhausen (CH)

(72) Inventors: Maksim Filipenko, Batumi (GE); Aleksandr Buival, Bremen (DE); Ruslan Mustafin, Tbilisi (GE); Ilya Shimchik, Zurich (CH); Stanislav Protasov, Singapore (SG); Serg Bell, Singapore (SG); Nikolay Dobrovolskiy, Alanya (TR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 144 days.

(21) Appl. No.: 18/045,158

(22) Filed: Oct. 9, 2022

(65) Prior Publication Data
US 2024/0116492 A1 Apr. 11, 2024

(51) Int. Cl.
*B60W 30/02* (2012.01)
*B60W 60/00* (2020.01)

(52) U.S. Cl.
CPC ........ *B60W 30/02* (2013.01); *B60W 60/0025* (2020.02); *B60W 2300/28* (2013.01); *B60W 2552/05* (2020.02)

(58) Field of Classification Search
CPC ............. B60W 30/02; B60W 60/0025; B60W 2300/28; B60W 2552/05
See application file for complete search history.

(56) References Cited

U.S. PATENT DOCUMENTS

| 7,103,460 B1 | 9/2006 | Breed |
| 7,774,138 B2 | 8/2010 | Matsui |

(Continued)

FOREIGN PATENT DOCUMENTS

JP 4984434 B2 * 7/2012

OTHER PUBLICATIONS

J. Betz et al., "Autonomous Vehicles on the Edge: A Survey on Autonomous Vehicle Racing," in IEEE Open Journal of Intelligent Transportation Systems, vol. 3, pp. 458-488, 2022, doi: 10.1109/OJITS.2022.3181510. keywords: {Autonomous systems;Advanced driver assistance systems;Autonomous vehicles;Location awareness;P.*

(Continued)

*Primary Examiner* — Peter D Nolan
*Assistant Examiner* — Anwar Mohamed
(74) *Attorney, Agent, or Firm* — ESPE Legal Consultancy FZ-LLC

(57) ABSTRACT

A system and method for optimizing the performance of an autonomous race car in real-time during a race event are disclosed. An autonomous race car controller unit is pre-fed with a first set of initial parameter values and a second set of initial parameter values. A set of sensors is configured for measuring a first and a second set of real-time parameter values after the starting of the race event. A performance optimization module is configured to generate a corrective course by receiving the first and second sets of real-time parameters and detecting the presence of errors between a control command given by the controller unit and its execution.

20 Claims, 3 Drawing Sheets

(56) References Cited

U.S. PATENT DOCUMENTS

| | | | |
|---|---|---|---|
| 10,551,838 | B2 | 2/2020 | Liu et al. |
| 10,796,204 | B2 | 10/2020 | Rohani et al. |
| 11,372,403 | B2 | 6/2022 | Havens et al. |
| 2020/0376927 | A1 | 12/2020 | Rajaie et al. |
| 2022/0017090 | A1 | 1/2022 | Sams et al. |

OTHER PUBLICATIONS

Balaji, Training procedure using a neural network that processes data from the video camera of an autonomous racing car, 2020.
Bari, Using a neural network to control a racing autonomous vehicle at the limit of adhesion to the roadway, 2018.
Betz, Using a neural network to control a racing autonomous vehicle, taking into account its controllability and evaluation of road adhesion, 2009.
Bhargav, An approach to offline training of a neural network of an autonomous racing vehicle for overtaking maneuvers on various sections of the track, 2021.
Borsboom, An approach to minimizing lap times for an electric race car with a continuously variable transmission, 2021.
Broere, An approach to minimizing lap time for a 4WD electric racing vehicle, taking into account the grip limit of each wheel, 2021.
Brudigam, Using a stochastic predictive control model and Gaussian processes to control a racing autonomous vehicle when overtaking, 2021.
Brunnbauer, Using simulation for reinforcement learning to drive a racing autonomous vehicle, 2021.
Cai, Training a neural network to control a racing autonomous vehicle in high-speed skid conditions, 2020.
Cai, Self-learning neural network algorithm for controlling a racing autonomous vehicle, 2021.
Cardamone, An algorithm for optimizing the trajectory of an autonomous racing vehicle to reduce lap time, 2010.
Christ, Planning the optimal trajectory of an autonomous racing vehicle, considering the difference in grip with the roadway for different wheels, 2019.
Garlick, Algorithm for real-time optimization of the trajectory of an autonomous racing vehicle on laboratory (not on- board) computing equipment, 2021.
Georgiev, An algorithm for optimizing the trajectory of an autonomous racing vehicle to reduce lap times by iteratively training a dynamic model, 2020.
Georgiev, Semi-parametric dynamic model training for autonomous racing, 2020.
Herrmann, An algorithm for optimizing the speed of an autonomous racing vehicle, taking changes of adhesion wheels to the roadway in time and space, 2020.
Hu, An approach to real-time road grip estimation based on vehicle lateral dynamics, 2020.
Jain, An approach to estimating the parameters of an autonomous racing vehicle, taking into account the side slip of the wheels, 2020.
Kabzan, A predictive control model with online training and regression-based on Gaussian processes to determine the residual uncertainty of the model is described. Provides a 10% reduction in lap time, 2019.
Kapania, An overview of self-learning algorithms for driving an autonomous racing vehicle, 2016.
Kapania, A two-stage algorithm for determining the trajectory of an autonomous racing vehicle, taking into account the restrictions regarding the wheels' grip with the roadway, 2019.
Kapania, An algorithm for determining the trajectory of an autonomous racing vehicle on the current lap is described, taking into account the results of previous laps, 2019.
Lovato, An approach to driving an autonomous racing vehicle, taking into account the lateral curvature/inclination of the roadway and the difference in camber angles of the vehicle's wheels, 2021.
Massaro, A method for minimizing lap time using a quasi-steady-state model under non-fixed motion trajectory conditions, 2019.
Massaro, A method for minimizing lap time using a quasi-steady-state model and a transient vehicle model under fixed trajectory conditions, 2020.
Pagot, A real-time non-linear model, predictive control approach, based on a kinetic-dynamic model for optimizing the trajectory of an autonomous racing vehicle, taking into account the longitudinal and lateral dynamics of the vehicle, 2020.
Rosolia, Algorithm for minimizing lap time when an autonomous racing vehicle is moving on the current lap, taking into account the results of previous laps, 2017.
Rosolia, An approach to minimizing lap times when driving an autonomous racing vehicle on the current lap, taking into account the results of previous laps. The approach involves the use of an affine time prediction model, 2019.
Siampis, An approach based on a non-linear four-wheel model predictive control for stabilizing an electric vehicle at the limit of permissible lateral acceleration, 2018.

* cited by examiner

SYSTEM AND METHOD FOR OPTIMISING PERFORMANCE OF AN AUTONOMOUS RACE CAR

TECHNICAL FIELD

The present subject matter is related to autonomous vehicles. In particular, the project subject matter relates to a system and method for optimizing the performance of an autonomous race car to reduce lap times. More specifically, the present subject matter envisages the variation of one or more parameters of the autonomous race car as well as that of the racetrack, on which the autonomous race car is driving, in real-time for improving the lap time of the autonomous race car.

BACKGROUND

Autonomous vehicles are enabled with self-driving capabilities by employing vehicular automation. More specifically, an autonomous vehicle that is specifically designed to sense the environment and operate with little or no human intervention. Autonomous or self-driving racing is an upcoming and evolving sport of racing autonomous race cars. In autonomous racing sports competitions, one of the most important things is to achieve the fastest lap time. A challenge, however, is posed due to the absence of a human driver. More specifically, the absence of the human driver directly translates to the absence of driving expertise that allows the human driver to make efficient and quick decisions to change the driving technique for achieving the fastest lap time. Such changes may be influenced by many parameters, such as, for example, tire wear, condition of the circuit road surface, temperature, humidity, rainfall, and so on.

For autonomous race cars, an important requirement is to overcome the disadvantageous aspect of the absence of a human driver. More specifically, for improving the lap times for consecutive laps of a racing circuit during a race, the autonomous race car is required to optimize its performance in real-time for ensuring improvement in lap times for consecutive laps.

There is a need for systems and methods for autonomous race cars for monitoring different parameters that influence the driving decisions that would be made by a human driver in traditional racing.

SUMMARY

A method and system for optimizing the performance of an autonomous race car in real-time during a race event is disclosed. The method and system generally comprise an autonomous race car controller unit pre-fed with a first set of initial parameter values and a second set of initial parameter values. A set of sensors is communicatively coupled to the autonomous race car controller unit. The set of sensors is configured for measuring a first set of real-time parameter values before the race event and a second set of real-time parameter values after the starting of the race event. The system further comprises a performance optimization module. The performance optimization module is configured for receiving the first set of real-time parameter values and the second set of real-time parameter values. The presence of one or more errors is detected between a control command given by the autonomous race car controller unit to the autonomous race car and execution of the control command by the autonomous race car to determine car instability. The detection is based on the first set of real-time parameter values and the second set of real-time parameter values. Additional information associated with the autonomous race car is learned, such as a race-circuit road surface and environment. A corrective course of action is generated for improving a lap time of the autonomous race car during the race event if errors are detected. The additional information and the corrective course of action is fed back to the autonomous race car controller unit when errors are detected.

In an exemplary embodiment, the first set of initial parameter values includes a plurality of parameter values associated with the autonomous race car before the starting of the race event.

In an exemplary embodiment, the second set of initial parameter values includes a plurality of parameter values associated with the environment and the race circuit road surface before the starting of the race event.

In an exemplary embodiment, the first set of real-time parameter values includes a plurality of parameter values associated with the autonomous race car subsequent to the starting of the race event.

In an exemplary embodiment, the second set of real-time parameter values includes a plurality of parameter values associated with the environment and the race circuit road surface subsequent to the starting of the race event.

In an exemplary embodiment, the additional information includes meaningful deductions associated with the autonomous race car, the race circuit road surface, and the environment derived based on the first set of real-time parameter values, the second set of real-time parameter values, and an optimization algorithm of the performance optimization module. In the context of the invention, a meaningful deduction associated with the autonomous race car refers to a deduction about how specific parameter values affect car performance during a race.

Thus, the invention comprises a method for optimizing the performance of an autonomous race car in real-time during a race event. The method generally comprises pre-feeding an autonomous-race-car-controller unit with a first set of initial parameter values and a second set of initial parameters values. Then a first set of real-time parameter values and a second set of real-time parameter values subsequent to a starting of the race event is measured with a set of sensors. A performance optimization module receives the first set of real-time parameter values and the second set of real-time parameter values. The performance optimization module detects the presence of one or more errors between a control command given by the autonomous race car controller unit to the autonomous race car and execution of the control command by the autonomous race car to determine car instability. An error refers generally to a discrepancy between initial and real-time parameters that results in a reduction in speed or performance of the autonomous race car. Error detection is based on the first set of real-time parameter values and the second set of real-time parameter values. The performance optimization module learns additional information associated with the autonomous race car, a race circuit road surface, and environment based on the detection and generates a corrective course of action for improving a lap time of the autonomous race car during the race event when errors are detected. The additional information and the corrective course of action is fed back to the autonomous race car controller unit.

In an exemplary embodiment, the first set of initial parameter values includes a plurality of parameter values associated with the autonomous race car before the starting of the race event.

In an exemplary embodiment, the second set of initial parameter values includes a plurality of parameter values associated with the environment and the race circuit road surface before the starting of the race event.

In an exemplary embodiment, the first set of real-time parameter values includes a plurality of parameter values associated with the autonomous race car subsequent to the starting of the race event.

In an exemplary embodiment, the second set of real-time parameter values includes a plurality of parameter values associated with the environment and the race circuit road surface subsequent to the starting of the race event.

In an exemplary embodiment, the additional information includes meaningful deductions associated with the autonomous race car, the race circuit road surface, and the environment derived based on the first set of real-time parameter values, the second set of real-time parameter values, and an optimization algorithm of the performance optimization module.

DETAILED DESCRIPTION

The embodiments will now be described more fully hereinafter with reference to the accompanying figures, in which alternative embodiments are shown.

Figure 1:
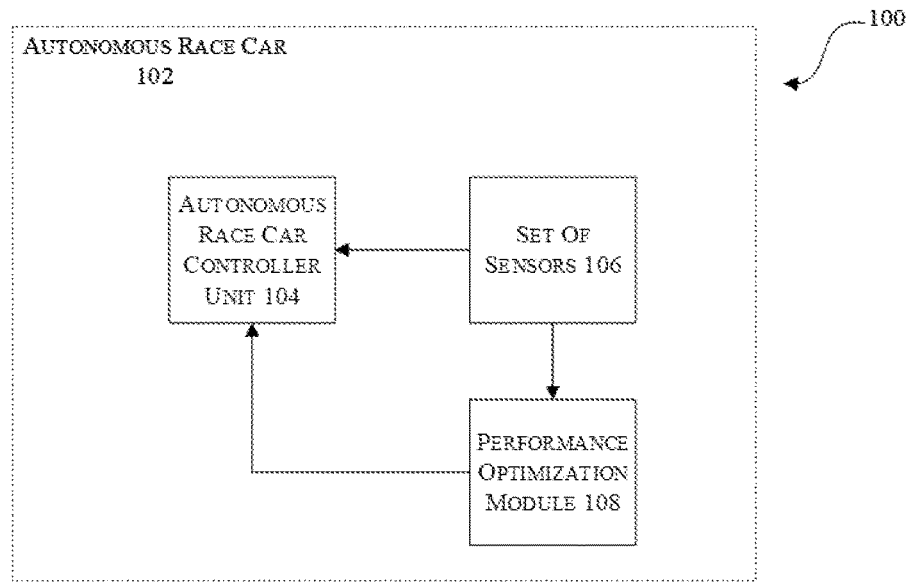
FIG. 1 illustrates a schematic block diagram of a system for optimizing the performance of an autonomous race car to reduce the lap times during a race event, in accordance with an embodiment of the present subject matter.

FIG. 1 illustrates a schematic block diagram of a system 100 for optimizing the performance of an autonomous race car 102 to reduce the lap times during a race event (hereinafter referred to as system 100), in accordance with an embodiment of the present subject matter. The system 100, in accordance with an embodiment of the present subject matter, comprises an autonomous race car controller unit 104 pre-fed with the first set of initial parameter values and the second set of initial parameter values.

In accordance with an embodiment of the present subject matter, the first set of initial parameter values includes a plurality of parameter values associated with the autonomous race car before the start of the race event. Some examples of the first set of initial parameter values include the values of battery charge, motor condition, tire wear, tire temperature, tire pressure, motor temperature, and so on. As a general consideration, the first set of initial parameter values may be all those parameter values that are associated with the autonomous race car just before the starting of a race event. Therefore, the first set of initial parameter values may be base reference parameter values for all the different parameters of the autonomous race car just before the starting of the race event. Thus, the first set of initial parameter values may indicate the different parameter values of the autonomous race car 102 when the autonomous race car 102 is primed and in its best condition for the race event.

In accordance with an embodiment of the present subject matter, the second set of initial parameter values includes a plurality of parameter values associated with the environment and the race circuit road surface before the starting of the race event. Therefore, the second set of initial parameter values may include, for example, a map layout. This may include data associated with the race circuit such as road inclination, curb positions, uphill and downhill sections, and so on. Other values include information associated with weather conditions just before the race event, information associated with a race-circuit road surface, and so on. In other words, the second set of initial parameter values may include information associated with all those parameters that are external to the autonomous race car 102 but may still affect the performance of the autonomous race car 102 during the race event.

The system 100 further comprises a set of sensors 106 communicatively coupled to the autonomous race car controller unit 104. The set of sensors 106 is configured for measuring a first set of real-time parameter values and the second set of real-time parameter values subsequent to the starting of the race event. In one embodiment, the set of sensors 106 may include lidars, cameras, IMU, real-time kinematic positioning (GNSS-RTK), temperature sensors, pressure sensors, slip angle sensors, operational support system (OSS), radars, wheel encoder, body slip angle, tire slip angle, and so on. Therefore, the set of sensors 106 includes all the sensors that are configured onboard the autonomous race car 102 and are provided for measuring parameters that may affect the performance of the autonomous race car 102 during the race event.

In accordance with an embodiment of the present subject matter, the first set of real-time parameter values includes a plurality of parameter values associated with the autonomous race car subsequent to the starting of the race event. Some examples of the first set of real-time parameter values include the values of battery charge, motor condition, tire wear, tire temperature, tire pressure, motor temperature, and so on that are taken at predetermined time intervals subsequent to the starting of the race event. As a general consideration, the first set of real-time parameter values may be all those parameter values that are associated with the autonomous race car that is taken in real-time after the starting of the race event. An advantageous aspect of monitoring the different parameter values of the autonomous race car 102 in real-time is that these parameter values may be used for the purpose of improving the performance of the autonomous race car 102 in real-time during the race event.

In accordance with an embodiment of the present subject matter, the second set of real-time parameter values includes a plurality of parameter values associated with the environment and the race circuit road surface after the start of the race event. Therefore, the second set of real-time parameter values may include, for example, a map layout of a race circuit for the race event, information associated with weather conditions just before the race event, information associated with the race circuit road surface at different locations along the race circuit such as wet patches, patches with excessive debris and tire dust, turn sharpness, and so on. Thus, the second set of real-time parameter values may include information associated with all those parameters that are external to the autonomous race car 102 but may still affect the performance of the autonomous race car 102 during the race event.

The system 100 further comprises a performance optimization module 108 configured onboard the autonomous race car 102. The performance optimization module 108 is configured for receiving the first set of real-time parameter values and the second set of real-time parameter values. More specifically, the performance optimization module 108 includes the optimization algorithm for receiving, analysing, and extracting meaningful deductions from the received values of the first set of real-time parameter values and the second set of real-time parameter values. In an exemplary embodiment, the optimization algorithm is a machine-learning algorithm. The performance optimization module 108 is further configured for detecting the presence of one or more errors between a control command given by the autonomous race car controller unit 104 to the autonomous race car 102 and the execution of the control command by the autonomous race car 102 to determine car instability, wherein the detection is based on the first set of real-time parameter values and the second set of real-time parameter values.

In accordance with one embodiment of the present subject matter, the performance optimization module 108 is configured for learning additional information associated with the autonomous race car 102, the race circuit road surface, and the environment based on the detection. Furthermore, if the performance optimization module 108 detects that there is, in fact, an error between the control command executed by the autonomous race car controller unit 104 and the execution of that command by the autonomous race car 102, then the performance optimization module 108 is configured for generating a corrective course of action for improving a lap time of the autonomous race car during the race event if the one or more errors are detected. The performance optimization module 108 is further configured for feeding back the additional information and the corrective course of action to the autonomous race car controller unit 104 if one or more errors are detected.

In accordance with an embodiment of the present subject matter, the additional information includes meaningful deductions associated with the autonomous race car 102, the race circuit road surface, and the environment derived from the first set of real-time parameter values, the second set of real-time parameter values, and an optimization algorithm of the performance optimization module 108. For example, a GKNSS-RTK sensor and the slip angle sensors may provide information regarding whether, at a sharp turn, the autonomous race car 102 has deviated from the path defined in the control command from the autonomous race car controller unit 104. If a deviation is detected, the performance optimization module 108 learns that the friction of the tire with the road surface at the sharp turn is not in line with the predicted path of the autonomous race car 102, thereby indicating that the autonomous race car 102 slipped outwardly from the predicted path and thus indicating that the friction between the tires and the road surface was insufficient. A meaningful deduction from such a scenario may be that the applied acceleration was more than required or that the road surface was either wet or contained excessive tire debris at the sharp turn. Therefore, as a corrective course of action, the performance optimization module 108 provides feedback to the autonomous race car controller unit 102 to monitor the acceleration at the sharp turn in the next lap. Alternatively, feedback is given to avoid that particular patch of road surface with excessive tire debris and thereby reduce the deviation of the autonomous race car 102 from the predicted path. The feedback thereby optimizes the performance of the autonomous race car 102 to reduce the lap time for the subsequent lap.

In another embodiment, the friction coefficient between the autonomous vehicle's tires and roads comprises a meaningful parameter. Across the autonomous vehicle's course, there is a contact coefficient that may be considered a default condition. With each lap, the parameter of friction may be increased or decreased. A racing course may be divided into different areas for purposes of parameter collection and analysis. Analysis may depend on weather. For example, both during and after a light rain some gathering of water on the racing surface is expected and this allows for setting an initial parameter. Comparing expected and actual values of a parameter, such as a contact coefficient, gives the autonomous vehicle the ability to correct performance during a race.

In a further example, the parameters reflect engine and battery use. Before the race, an optimal speed for speed at corners and turns is calculated. After the first lap or subsequent laps, collected parameter data reveal that the estimation of battery and engine is not correct. For example, the autonomous vehicle does not achieve the expected speed using the initial parameters. A decrease in the target speed for the next lap is then calculated. Actual parameters are measured on a lap-by-lap or segment-by-segment basis during the race and speed is recalculated with optimized battery and engine parameters.

In yet another example, the parameter at issue comprises g-forces during cornering or top speed. During the race, unexpected airflow, side winds, or other unknown or unpredicted factors contradict the a priori top speed calculated for a particular lap or lap segment. For example, the autonomous vehicle starts with a 100 km per hour top speed. Parameter values measured during a lap or lap segment reveal that this top speed may be increased for the next lap or lap segment based on parameter recalculations in view of measured parameters. Corrections include going to the outer radius of the circle when corning or decreasing speed.

Other parameters include tire friction and degradation. For example, before the race, tire degradation can be predicted but could change during the race. The actual degradation is measured in race and then recalculated to an optimized parameter.

In traditional racing, human drivers make decisions based on experience, perception, and arbitrary preferences. For example, certain pathing during a race may be chosen by a human driver because of past experience, comfort level, and emotional state. In autonomous racing according to the invention, actual race time parameters are measured and corrected without regard to bias and preferences inherent in human drivers. The corrections applied are more precise and justified by data. Aerodynamics and friction measurements determine how and why the top speed varies and how to make adjustments over the course of a lap or lap segment. Thus, parameters are adjusted based only on conditions that actually affect autonomous car performance and by automatic correction of parameters during a race. For example, the friction coefficient for a given vehicle configuration and race path is calculated a priori to be x. This value is recalculated during the race based on measured parameters. For example, oversteering or understeering are reduced and autonomous car performance improved.

Figure 2:
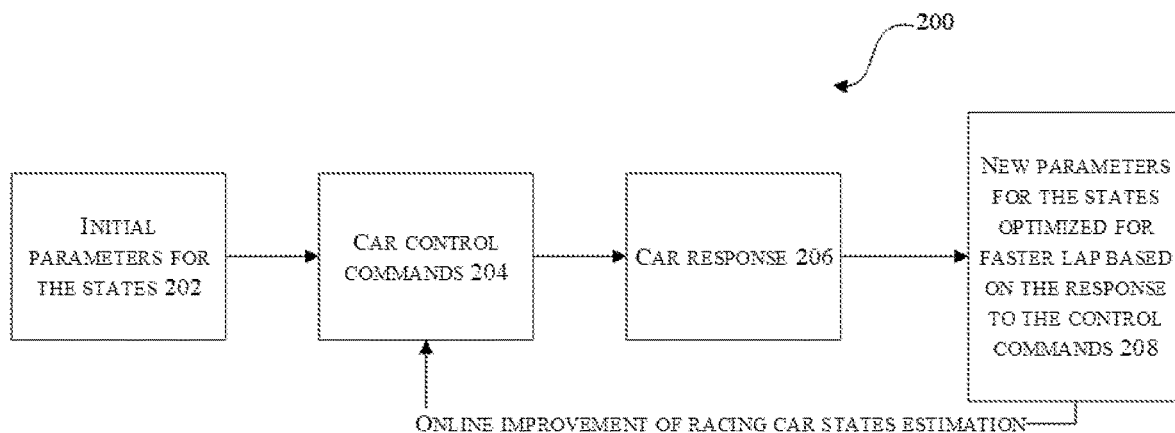
FIG. 2 illustrates a schematic block diagram depicting a general operational scheme of the system, in accordance with an embodiment of the present subject matter.

A schematic operation of system 100 is described with reference to FIG. 2. FIG. 2 illustrates a schematic block diagram depicting a general operational scheme of the system 100, in accordance with an embodiment of the present subject matter. Referring to FIG. 2, the operation scheme 200 is described. At block 202, the initial parameters are recorded and pre-fed to the autonomous car controller unit 104, in accordance with one embodiment of the present subject matter. More specifically, these initial parameters are nothing but the first and second sets of initial parameter values. The first set of initial parameter values comprises the values of parameters associated with the autonomous race car 102, such as battery charge, motor conditioning, motor temperature, tire wear, tire temperature, tire pressure, and the like. The second set of initial parameter values comprises parameters external to the autonomous race car 102, such as weather conditions, race-circuit road surface information, the map of the race circuit, and so on.

At block 204, at the start of a race event, the autonomous car controller unit 104 of the autonomous race car 102 gives control commands to the autonomous race car 102 based on the first and second set of initial parameter values for extracting the most optimal performance from the autonomous race car 102 for completing a circuit lap in a shortest possible time period. At block 206, the car response is recorded by means of the set of sensors 106. More specifically, the different sensors configured on the autonomous race car 102 allow the monitoring of various parameters such as tire wear, tire pressure, car movement, car acceleration or deceleration (braking), and friction of the tires with the race circuit road surface, and so on. Therefore, the set of sensors 106 facilitates monitoring of the response that the autonomous race car 102 provides to the control commands given by the autonomous race car controller unit 104. This response is recorded by the set of sensors in the form of the first set of real-time parameter values and the second set of real-time parameter values. At block 208, new parameter values, the first and second sets of real-time parameter values, are recorded for optimizing and improving the performance of the autonomous race car 102 to reduce the lap time during the race event. More specifically, the first and second sets of real-time parameter values are analysed further by the performance optimization module 108, wherein the performance optimization module 108 is configured onboard the autonomous race car 102. This analysis is then fed back from block 208 to block 204, as seen in FIG. 2. For example, the performance optimization module 108 analyses the first and second sets of real-time parameter values, detects if there is an error between the control command given out by the autonomous race car controller unit 104 and the execution of the command by the autonomous race car 102. The performance organization module 108 learns additional information about the autonomous race car 102, the race circuit road surface, and the environment while also providing a corrective course of action, which is then fed back to the autonomous car controller unit 104. In an embodiment, this feedback loop continues to operate as long as the autonomous race car 102 is participating in the race event. Thus, the first and second sets of real-time parameter values are updated and further analysed for continued optimization of the performance of the autonomous race car 102. The feedback loop from the performance optimization module 108 to the autonomous car controller unit 104 is thus a process that keeps on repeating itself throughout the race event.

Figure 3:
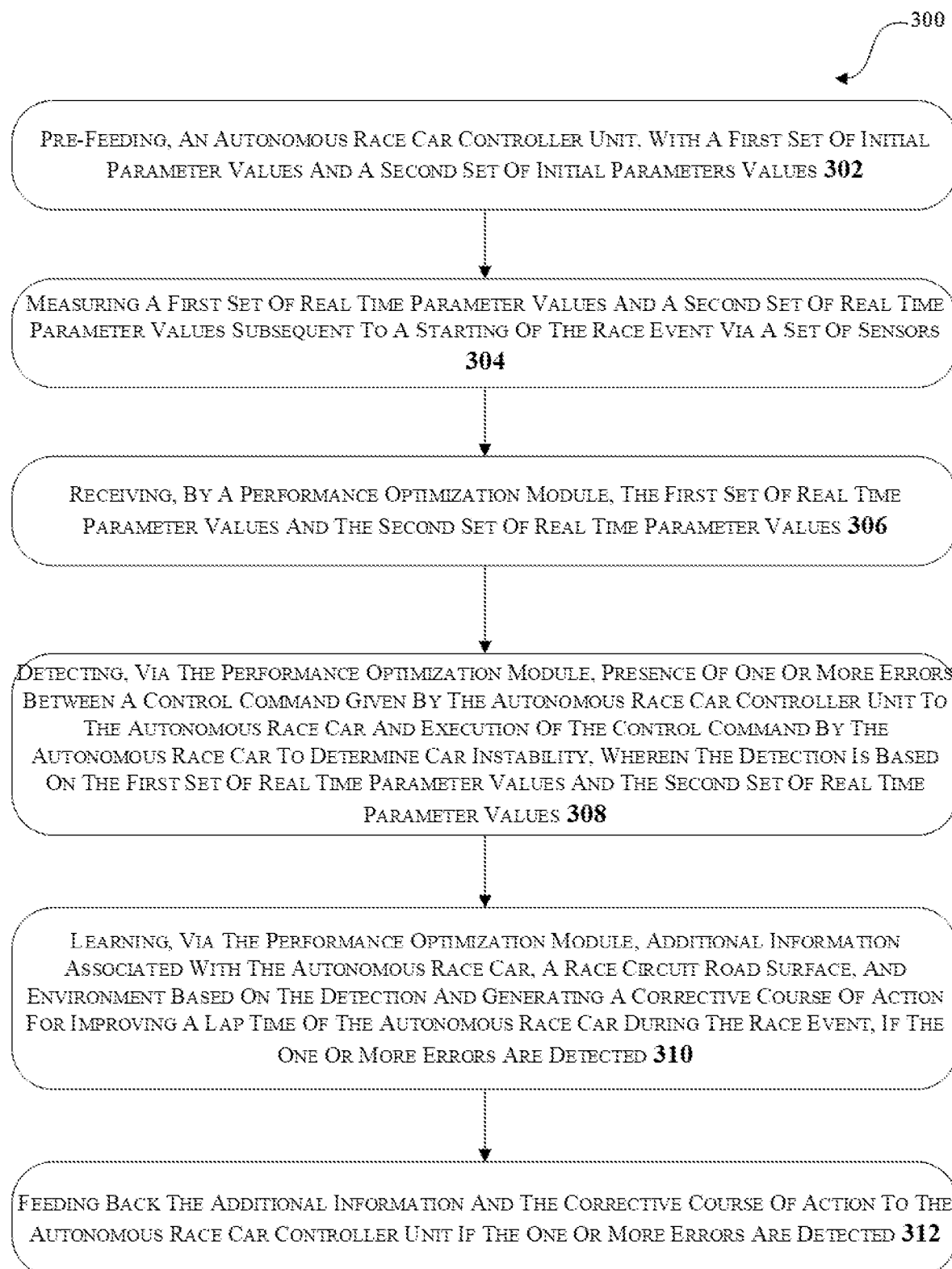
FIG. 3 illustrates a schematic block diagram of a method for optimizing the performance of an autonomous race car to reduce the lap times during a race event, in accordance with an embodiment of the present subject matter.

The present subject matter also envisages a method 300 for optimizing the performance of an autonomous race car in real-time during a race event as shown in in FIG. 3.

At block 302, method 300 includes the step of pre-feeding an autonomous race car controller unit 104 with the first set of initial-parameter values and the second set of initial-parameter values. In an embodiment, the first set of initial parameter values includes a plurality of parameter values associated with the autonomous race car before the starting of the race event, and the second set of initial parameter values includes a plurality of parameter values associated with the environment and the race circuit road surface before the starting of the race event. In an embodiment, some values from the first set of initial parameter values are provided by the manufacturers of parts, components, or assemblies used by the autonomous race car 102. In other embodiments, the values are derived from measurement techniques, including optimization calculations. For example, the information associated with tire wear may be provided by the tire manufacturer, whereas the information associated with the battery's state of charge (SOC) may be provided by the autonomous race car 102. The information associated with the second set of initial parameter values is obtained in one or more of the same ways. This information is based on the first and second set of initial parameter values that the autonomous race car controller unit 104 provides the control commands to the autonomous race car 102 at the start of the race event for extracting the most optimal performance from the autonomous race car 102.

At block 304, method 300 includes the step of measuring a first set of real-time parameter values and the second set of real-time parameter values subsequent to the starting of the race event via a set of sensors. In an embodiment, the first set of real-time parameter values includes a plurality of parameter values associated with the autonomous race car subsequent to the starting of the race event, and the second set of real-time parameter values includes a plurality of parameter values associated with the environment and the race circuit road surface subsequent to the starting of the race event. The first and second sets of real-time parameter values are recorded by the set of sensors 106 configured onboard the autonomous race car 102.

At block 306, method 300 comprises the step of receiving, by a performance optimization module 108, the first set of real-time parameter values and the second set of real-time parameter values. In an embodiment, the performance optimization module 108 is configured onboard the autonomous race car 102. Method 300 is for optimizing the performance of the autonomous race car 102 for reducing the lap time during the race event, and for that, the first set of real-time parameter values and the second set of real-time parameter values are constantly recorded by the set of sensors 106 and analysed by the performance optimization module 108.

At block 308, the method 300 includes the step of detecting, via the performance optimization module 108, the presence of one or more errors between a control command given by the autonomous race car controller unit 104 to the autonomous race car 102 and the execution of the control command by the autonomous race car 102 to determine car instability, wherein the detection is based on the first set of real-time parameter values and the second set of real-time parameter values. More specifically, in this step, the performance optimization module 108 identifies whether the autonomous race car 102 is performing in accordance with the control commands given by the autonomous race car controller unit 104. This optimization uses an analysis of the first and second real-time parameter values. More specifically, the analysis detects errors and monitors the real-time parameters that can still be used for further processing. If an error is not detected between the control command from the autonomous race car controller unit 104 and its execution by the autonomous race car 102, the information from the first and second set of real-time parameter values allows the performance optimization module 108 to learn that the current performance of the autonomous race car 102 does not require any further optimization. The same control commands are typically repeated for subsequent laps as well for the same sets of real-time parameter values.

At block 310, the method 300 comprises the step of learning, via the performance optimization module 108, additional information associated with the autonomous race car, a race circuit road surface, and an environment. Errors detected are used to generate a corrective course of action for improving a lap time of the autonomous race car during the race event. In this step, the performance optimization module 108 derives information from the first and second sets of real-time parameter values. For example, during the race, the tire temperature may appear to be lower than expected, while at the same time the friction between the road surface and the tires may be inadequate. Therefore, the performance optimization module 108, in accordance with one embodiment, may process these values to arrive at the conclusion that it is raining. This happens when, for example, detected error correlates with wet road conditions. In another example, at a sharp turn, the autonomous race car 102 slightly deviated outwardly while making the turn, whereas the tire temperature and tire wear were at expected values. In such a scenario, the performance optimization module 108 concludes that the acceleration was more than required at that particular sharp turn, and this caused the autonomous race car 102 to deviate from the predicted path. In this context, additional information is not the information obtained from the set of sensors 106, but it is the deductions that the performance optimization module 108 makes based on the first and second sets of real-time parameter values in conjunction with the optimization algorithm of performance optimization module 108. The additional information, in accordance with the present embodiment, includes a corrective course of action. The corrective course of action is generated by the performance optimization module 108 when an error is detected at step 308 of the method 300.

At block 312, method 300 comprises the step of feeding back the additional information and the corrective course of action to the autonomous race car controller unit 104 if one or more errors are detected. The step of feeding back the additional information and the corrective course of action to the autonomous race car controller unit 104 is to allow the autonomous race car controller unit 104 to provide the control commands to the autonomous race car 102 differently when the autonomous race car 102 faces the same constraints in the next lap. The step of providing the feedback is a continuous process, which causes the first and second real-time values to be constantly updated and analysed for optimization during the course of the race event in order to minimize the time required by the autonomous race car for completing the next lap.

Figure 4:
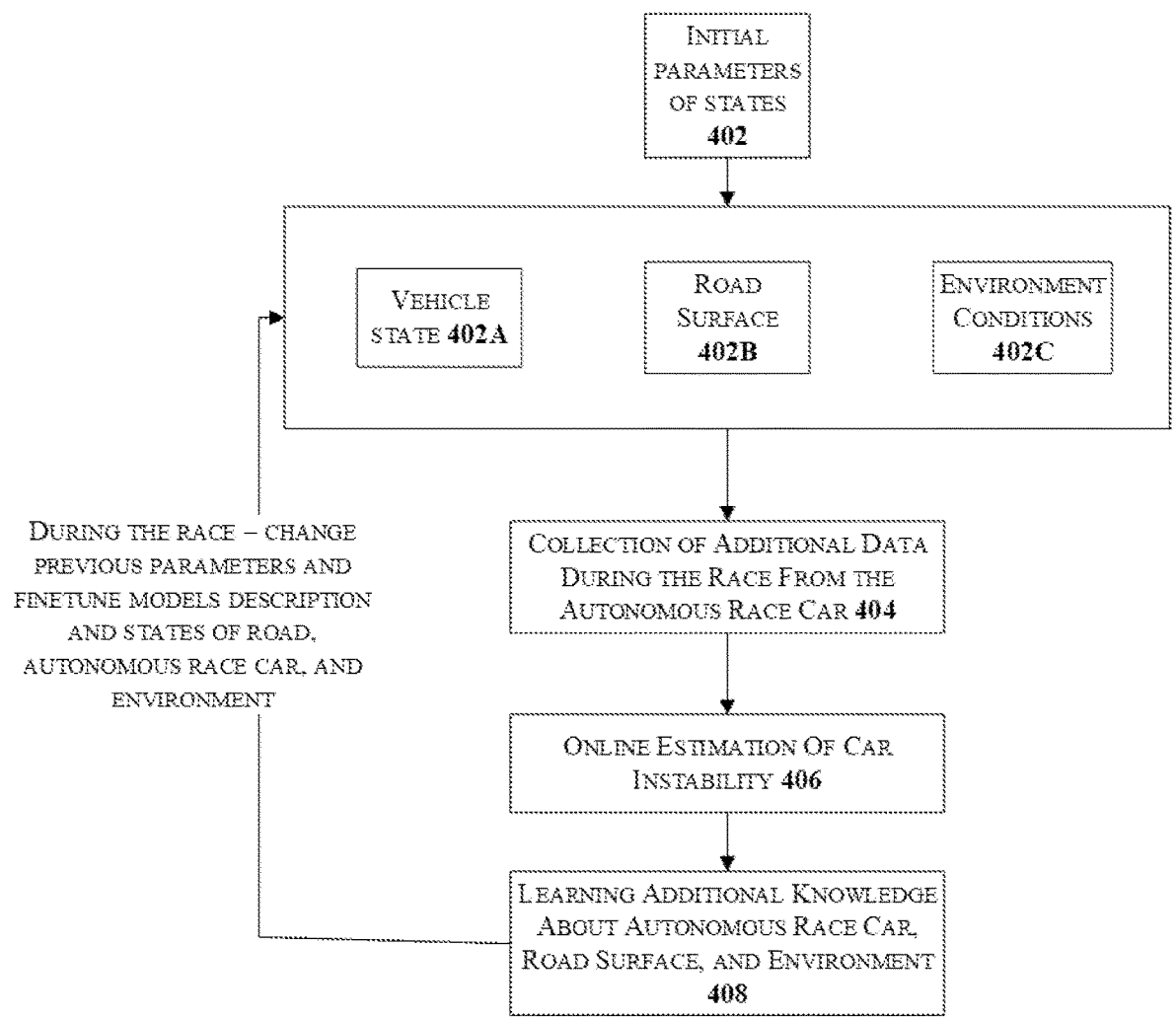
FIG. 4 illustrates a schematic block diagram depicting a general operational scheme of the method, in accordance with an embodiment of the present subject matter.

FIG. 4 illustrates a schematic block diagram 400 depicting a general operational scheme of the method 300, in accordance with an embodiment of the present subject matter. At block 402, the initial parameters, i.e., the first and second sets of initial parameter values are pre-fed to the autonomous race car controller unit 104. The first set of initial parameter values includes information associated with vehicle state 402A, whereas the second set of initial parameter values includes information associated with race circuit road surface 402B and environment conditions 402C. After the race event begins, the autonomous race car controller unit 104 gives the control commands to the autonomous race car 102 based on the initial parameter values 402A, 402B, and 402C. As soon as the race event begins, the autonomous race car 102 begins to drive autonomously.

At block 404, as the autonomous race car 102 starts the race, the set of sensors 106 configured on board the autonomous race car 102 are configured to record and collect additional data during the race in real-time, thus obtaining the first and second sets of real-time parameter values. These parameter values are updated values of the vehicle state 402A, the race circuit road surface 402B, and the environment conditions 402C after the race event has started. These parameters vary as the autonomous race car 102 is driving, and constant monitoring of these parameters allows for capturing and processing of data in real-time for optimization purposes.

At block 406, estimation of car instability is carried out in real-time. In one embodiment, the performance optimization module 108 performs the estimation of the car instability by processing the first and second real-time parameter values. This step includes performing an analysis of the first and second real-time parameter values, i.e., the updated values of different parameters associated with the vehicle state 402A, the race circuit road surface 402B, and the environment conditions 402C for determining if the autonomous race car 102 is performing in accordance with the control commands given out by the autonomous race car controller unit 104. If there are inconsistencies between the expected and actual values of the first and second set of real-time parameter values, the performance optimization module 108 detects the error and estimates the car instability. If the expected and actual values of the first and second real-time parameter values are consistent, no car instability is detected, and this is an indication to the autonomous race car controller unit 104 that no corrective action is required when the autonomous race car 102 faces the same constraints in the next lap.

At block 408, the performance optimization module 108 learns additional information about the autonomous race car 102, the race circuit road surface, and the environment. More specifically, as discussed previously, additional information is the meaningful deductions that the performance optimization module 108 arrives at based on the first and second sets of real-time parameter values and the optimization algorithm of the performance optimization module 108.

What is claimed is:

1. A system for optimizing the performance of an autonomous race car in real-time during a race event, the system comprising:
    an autonomous race car controller unit pre-fed with the first set of initial parameter values and the second set of initial parameter values;
    a set of sensors communicatively coupled to the autonomous race car controller unit, the set of sensors configured for measuring a first set of real-time parameter values and the second set of real-time parameter values subsequent to the starting of the race event;
    a performance optimization module configured for:
        receiving, according to an optimization algorithm, the first set of real-time parameter values and the second set of real-time parameter values;
        detecting, using the optimization algorithm, the presence of one or more errors between a control command given by the autonomous race car controller unit to the autonomous race car and execution of the control command by the autonomous race car to determine car instability, wherein the detection is based on the first set of real-time parameter values and the second set of real-time parameter values; and learning additional information deduced by the optimization algorithm and associated with the autonomous race car, a race circuit road surface, and environment based on the detection and generating a corrective course of action for improving the lap time of the autonomous race car during the race event, if the one or more errors are detected; and feeding back the additional information and the corrective course of action to the autonomous race car controller unit if one or more errors are detected.

2. The system of claim 1, wherein the first set of initial parameter values includes a plurality of parameter values associated with the autonomous race car before the starting of the race event.

3. The system of claim 1, wherein the second set of initial parameter values includes a plurality of parameter values associated with the environment and the race circuit road surface before the starting of the race event.

4. The system of claim 1, wherein the first set of real-time parameter values includes a plurality of parameter values associated with the autonomous race car subsequent to the starting of the race event.

5. The system of claim 1, wherein the second set of real-time parameter values includes a plurality of parameter values associated with the environment and the race circuit road surface subsequent to the starting of the race event.

6. The system of claim 1, wherein the additional information includes deductions associated with the autonomous race car, the race circuit road surface, and the environment derived based on the first set of real-time parameter values, the second set of real-time parameter values.

7. The system of claim 1, wherein feeding back the additional information and the corrective course of action to the autonomous race car controller unit is continuous such that the first set of real-time parameter values and the second set of real-time parameter values are continuously updated during the race event.

8. The system of claim 1, wherein the control commands are different from a first lap to a second lap when the autonomous race car faces the same constraints on the first lap and the second lap.

9. The system of claim 1, wherein the optimization algorithm is a machine learning (ML) algorithm.

10. The system of claim 1, wherein the corrective course of action is additionally monitoring at least one of the autonomous race car, the race circuit road surface, or the environment at a relative location of the race circuit road surface based on the deductions.

11. The system of claim 1, wherein the corrective course of action is avoiding a relative location of the race circuit road surface based on the deductions.

12. A method for automatically adjusting the settings of an autonomous race car during a race event by measuring actual parameters, comparing them to expected values of these parameters and adjusting said settings to decrease the difference between measured and expected values, the method comprising:
pre-feeding, an autonomous race car controller unit, with the first set of target parameter values and the second set of initial parameters values;
measuring a first set of real-time parameter values and the second set of real-time parameter values subsequent to the starting of the race event via a set of sensors;
receiving, by a performance optimization module according to an optimization algorithm, the first set of real-time parameter values and the second set of real-time parameter values;

detecting, by the performance optimization module using the optimization algorithm, the presence of one or more errors between a control command given by the autonomous race car controller unit to the autonomous race car and execution of the control command by the autonomous race car to determine car instability, wherein the detection is based on the first set of real-time parameter values and the second set of real-time parameter values;

learning, via the performance optimization module deduced by the optimization algorithm, additional information associated with the autonomous race car, a race circuit road surface, and environment based on the detection and generating of a corrective course of action for improving the lap time of the autonomous race car during the race event, if the one or more errors are detected; and feeding back the additional information and the corrective course of action to the autonomous race car controller unit if one or more errors are detected.

13. The method of claim 12, wherein the first set of initial parameter values includes a plurality of parameter values associated with the autonomous race car before the starting of the race event.

14. The method of claim 12, wherein the second set of initial parameter values includes a plurality of parameter values associated with the environment and the race circuit road surface before the starting of the race event.

15. The method of claim 12, wherein the first set of real-time parameter values includes a plurality of parameter values associated with the autonomous race car subsequent to the starting of the race event.

16. The method of claim 12, wherein the second set of real-time parameter values includes a plurality of parameter values associated with the environment and the race circuit road surface subsequent to the starting of the race event.

17. The method of claim 12, wherein the additional information includes meaningful deductions associated with the autonomous race car, the race circuit road surface, and the environment derived based on the first set of real-time parameter values, the second set of real-time parameter values.

18. A method for optimizing the performance of an autonomous race car in real-time during a race event, the method comprising:
pre-feeding, an autonomous race car controller unit, with the first set of initial parameter values and the second set of initial parameters values;
measuring a first set of real-time parameter values and the second set of real-time parameter values subsequent to the starting of the race event;
detecting, using an optimization algorithm the presence of one or more errors between a control command given by the autonomous race car controller unit to the autonomous race car and execution of the control command by the autonomous race car to determine car instability, wherein the detection is based on the first set of real-time parameter values and the second set of real-time parameter values;
learning additional information deduced by the optimization algorithm and associated with the autonomous race car, a race circuit road surface, and environment based on the detection and generating a corrective course of action for improving the lap time of the autonomous race car during the race event, if the one or more errors are detected; and feeding back the additional information and the corrective course of action to the autonomous race car controller unit if one or more errors are detected.

19. The method of claim 18, wherein the first set of real-time parameter values and the second set of real-time parameter values are obtained via a set of sensors configured onboard the autonomous race car.

20. The method of claim 18, wherein the steps of detecting, learning, and feeding back are carried out in whole or in part by a performance optimization module configured onboard the autonomous race car.

* * * * *